(12) United States Patent
Wieland

(10) Patent No.: US 7,706,920 B2
(45) Date of Patent: Apr. 27, 2010

(54) SMOOTH CLIPPING OF DATA STREAMS

(75) Inventor: Alexis Paul Wieland, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 398 days.

(21) Appl. No.: 11/858,026

(22) Filed: Sep. 19, 2007

(65) Prior Publication Data

US 2009/0076652 A1   Mar. 19, 2009

(51) Int. Cl.
*G05B 19/19* (2006.01)
*G05B 19/04* (2006.01)

(52) U.S. Cl. .................. 700/254; 700/56; 700/256; 700/302; 700/304; 318/568.17; 318/568.2; 345/474; 340/436

(58) Field of Classification Search .................. 700/250
See application file for complete search history.

(56) References Cited

U.S. PATENT DOCUMENTS

| | | | | |
|---|---|---|---|---|
| 5,371,669 A | * | 12/1994 | Venkataraman et al. ....... | 700/40 |
| 5,740,327 A | * | 4/1998 | Funaya ........................ | 700/254 |
| 6,049,756 A | * | 4/2000 | Libby ......................... | 701/301 |
| 7,238,079 B2 | | 7/2007 | Madhami et al. | |
| 2004/0267404 A1 | * | 12/2004 | Danko ......................... | 700/245 |
| 2005/0153624 A1 | | 7/2005 | Wieland et al. | |
| 2007/0021032 A1 | * | 1/2007 | Tye et al. .................... | 446/377 |
| 2007/0252839 A1 | * | 11/2007 | Joly et al. ................... | 345/474 |

\* cited by examiner

*Primary Examiner*—Thomas G Black
*Assistant Examiner*—Lin B Olsen
(74) *Attorney, Agent, or Firm*—Knobbe, Martens, Olson & Bear, LLP

(57) ABSTRACT

A method for controlling movement of movable object having a plurality of movable subcomponents comprises receiving an instruction configured to generate a defined movement of a selected subcomponent of the movable object between a first state and a second state. The method further comprises determining whether execution of the defined movement results in the selected subcomponent leaving a motion space associated with the selected subcomponent. The motion space is defined by a motion space boundary. The method further comprises producing a modified instruction configured to generate a modified movement of the selected subcomponent between the first state and the second state. Execution of the modified movement results in the selected subcomponent remaining within the motion space. At least a portion of the modified movement deviates from the defined movement.

22 Claims, 12 Drawing Sheets

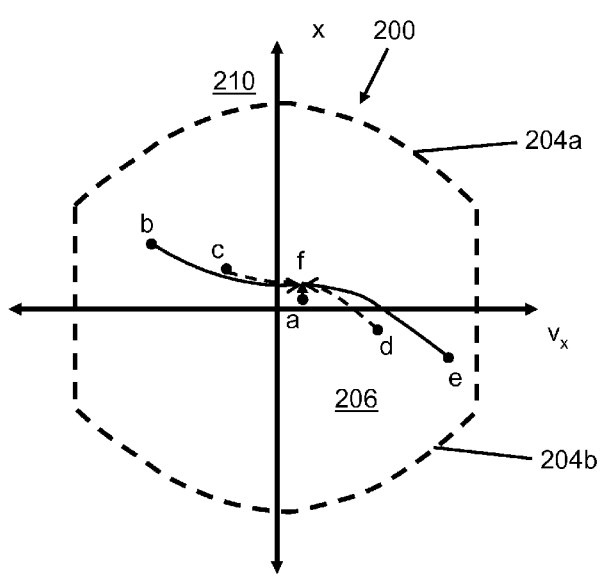
FIG. 6A
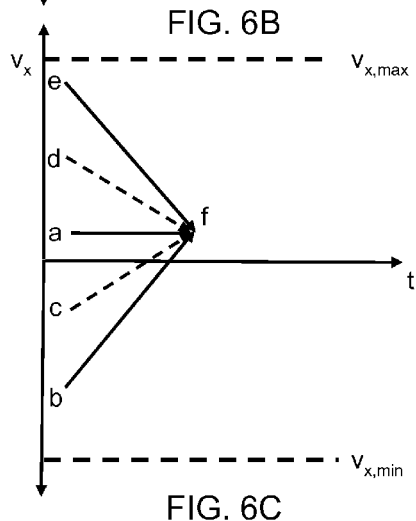
FIG. 6B
FIG. 6C

SMOOTH CLIPPING OF DATA STREAMS

BACKGROUND OF THE INVENTION

1. Field of the Invention

Embodiments of the present disclosure relate to control systems and, in particular, to feedback control systems which modify motion control data so as to allow a controlled system to smoothly conform to physical constraints.

2. Description of the Related Art

An animated mechanical figure or robot is a movable object that is animated through the use of one or more electromechanical (e.g. electric, hydraulic, pneumatic, or similar) devices, which are generally referred to as "actuators". At a fundamental level, the actuators translate control signals, also referred to as "motion control data" or "instruction data," into motion, thereby animating the figure or robot. The manner in which each actuator moves is dictated by the instruction data, which defines target states for each actuator in the figure or robot to achieve. These states may include, but are not limited to, position, velocity, and acceleration states. The instruction data provided to each actuator are coordinated so as to allow the figure or robot to achieve a desired effect, such as simulating the appearance of a person engaging in a moving activity. Animated mechanical figures are used in a wide variety of applications, including in theme parks, in moving artistic works, and in animated commercial devices.

The instruction data preferably generate movements which stay within defined limits. In one aspect, position limits reflect that actuators possess a finite range of motion, and cannot adopt certain positions. In another aspect, velocity and acceleration limits reflect the finite limits on the speed with which the actuators can respond and the torque that the actuators can apply.

Failure of the instruction data to remain within these limits may result in undesirable effects. For example, instruction data outside the limits may: (a) describe a motion that the actuators are not able to physically realize, (b) describe a motion that may damage the physical system, and/or (c) describe a motion that may result in unplanned stopping, jerking, and/or vibration of the figure, detracting from the theatrical illusion provided by the figure and detracting from the viewer's experience in viewing the figure. Therefore, steps are generally taken to prevent actuators from attempting to reach states outside of these limits.

This situation is further complicated by the fact that manipulating the operation of a selected actuator to conform to a physical constraint will often require manipulating the operation of other actuators in the system. For example, in a robot with two feet on the ground, adjusting the instruction data that control the position of one knee will typically result in changes to the instruction data that control other actuators, such as those in the hips and/or other knee, in order to substantially prevent the robot from falling over or undergoing some other undesired motion.

This process of manipulating the operation of an actuator in response to a constraint is typically referred to as "clipping". Conventionally, clipping often results in abrupt, high frequency movements or vibrations of the animated figure as the motion of the actuator is changed to comply with the constraint. A number of techniques are employed to reduce the detrimental effects of clipping. In one aspect, the motion of the actuator is subjected to a low pass filter, which substantially attenuates frequencies above a selected cutoff frequency, thereby inhibiting the high frequency movements typically associated with clipping. In another aspect, mechanical compliance is introduced into the system, resulting in a system that mechanically absorbs kinetic energy generally, such that when a constraint is encountered, less kinetic energy is available to be dissipated in the large vibrations having the unnatural appearance associated with clipping.

SUMMARY OF THE INVENTION

While the foregoing techniques can be used to mask the detrimental high frequency movements or vibrations of an animated figure when clipping occurs, they nevertheless suffer from significant disadvantages. In one aspect, filters are indiscriminate, attenuating all frequencies above the cutoff, including frequencies that are part of the desired motion. Thus, the movements of the actuator may be affected beyond those intended, creating further undesirable artifacts in the motion of the figure. Additionally, filters can delay the transmission of instructions to the actuators, causing actuator motions to become uncoordinated and potentially introducing undesirable combinations of actuator movements, as well as limiting the speed that unanticipated input can effect the resulting motion. Furthermore, filtering can only be performed as a "forward" transform, meaning that it is generally impossible to simultaneously adjust other actuators in the system based on the filtering of a clipped actuator.

In another aspect, robots having a large amount of mechanical compliance absorb a relatively large amount of kinetic energy, making it difficult to move such figures quickly. Thus, robots with high mechanical compliance tend to only be capable of relatively slow, sweeping motions which may not be adequate for some applications.

Based on the foregoing, Applicant has developed improved systems and methods for conforming a controlled animated system with constraints imposed by both the actuators and the animated physical system itself in a way that provides the desired movements of the animated system.

In one embodiment, a method for controlling movement of movable object having a plurality of movable subcomponents comprises receiving an instruction configured to generate a defined movement of a selected subcomponent of the movable object from an initial state, through a first set of intermediary states, to a target state. The method further comprises determining whether one or more states comprising the first set of intermediary states are outside a motion space associated with the selected subcomponent. The method additionally comprises determining a rejoinder acceleration that, when applied to a selected state in the first set of intermediary states, causes states subsequent to the selected state to remain within the motion space. The method also comprises producing a modified instruction configured to generate a modified movement of the selected subcomponent from the initial state, through a second group of intermediary states, to the target state, when at least a portion the first set of intermediate states is projected to lie outside the motion space, where the modified instruction is produced by applying the rejoinder acceleration to at least one of the states comprising the first set of intermediary states, and where the second group of intermediate states are within the motion space.

In another embodiment, a system for controlling the movement of an actuator comprises a first processing module. The first module (a) receives motion instructions that define a movement of the actuator from an initial state, through a first set of intermediary states, to a target state and (b) determines whether one or more states comprising the first set of intermediary states are outside a motion space associated with the actuator. The system further comprises a second processing module. The second module (a) determines a rejoinder acceleration that, when applied to a selected state in the first set of intermediary states, causes states subsequent to the selected state to remain within the motion space and (b) generates modified motion instructions that define a modified movement of the actuator from the initial state, through a second group of intermediary states, to the target state, where at least a portion the first set of intermediate states is projected to lie outside the motion space, wherein the modified instruction is produced by applying the rejoinder acceleration to at least one of the states comprising the first set of intermediary states, and where the second group of intermediary states are within the motion space.

In another embodiment, an animated object having a moveable subcomponent comprises an actuator capable of moving the subcomponent between an initial state and a target state. The actuated object further comprises a motion control system. The motion control system is configured to receive instruction data that generates a defined movement of the subcomponent from the initial state, through a first set of intermediate states, to the target state. The motion control system is further configured to determine whether one or more states comprising the first set of intermediate states are outside a motion space associated with the subcomponent. The motion control system is additionally configured to determine a rejoinder acceleration that, when applied to a selected state in the first set of intermediate states, causes states subsequent to the selected state to remain within the motion space. The motion control system is also configured to produce modified instruction data that generates a modified movement of the selected subcomponent from the initial state, through a second group of intermediary states, to the target state, where (a) at least a portion the first set of intermediate states is projected to lie outside the motion space, (b) the modified instruction is produced by applying the rejoinder acceleration to at least one of the states comprising the first set of intermediary states, and (c) the second group of intermediate states are within the motion space.

BRIEF DESCRIPTION OF THE DRAWINGS

FIGS. 6A-6C schematically illustrate the process of rejoining clipped and unclipped motion paths under conditions of constant velocity in the original instruction data;

DETAILED DESCRIPTION OF THE PREFERRED EMBODIMENTS

Embodiments of the present disclosure relate to systems and methods for modifying or "clipping" movement instruction data provided to movable subcomponents of animated figures or robots. The movement data is modified in order to substantially avoid moving the subcomponents into one or more states which are beyond selected limits. In certain embodiments, such limits represent physical constraints on the operation of the actuators that move the subcomponents. In an example embodiment, the movement data is modified "smoothly," such that artifacts of the modification-which can include detrimental or unnatural, sudden jarring movements-are attenuated or substantially hidden from a person viewing the animated figure. In other embodiments, the movement data is modified so as to prevent physical damage to the moveable subcomponents which can arise when adopting one or more states beyond the selected limits. While discussion of the systems and methods below is presented in the context of mechanically actuated figures and robots, other embodiments the systems and methods disclosed herein are applied generally to control of a wide variety of other types of moving subcomponents.

In one embodiment, animated figures comprise combinations of hardware, software, firmware programs, and communications links, as well as physical enclosures, used to simulate the appearance and movement of a selected figure. Examples of such figures include, but are not limited to, humanoid and animal figures, normally inanimate objects such as trees, and mythological and historical figures such as dragons and dinosaurs. One example of an animated figure is provided in U.S. Patent Application Publication Number 2007/0021032, entitled "SKELETAL SUPPORT STRUCTURE AND SKIN FOR AN ANIMATRONIC FIGURE," which is incorporated herein by reference in its entirety.

In one embodiment, the animated figure may comprise a support structure and skin which contain the moveable subcomponents. In one aspect, the skin and support structure may be configured to appear realistic, despite movement, stretch, and compression which occur as the animated figure moves. In a further aspect, the skin and support structure may accommodate complex shapes in order to hide the underlying moveable subcomponents. In one embodiment, the supporting structure may comprise combinations of structural materials, such as metals, polymers, woods, ceramics, and composites thereof. In another embodiment, the skin comprises a polymer.

Figure 1:
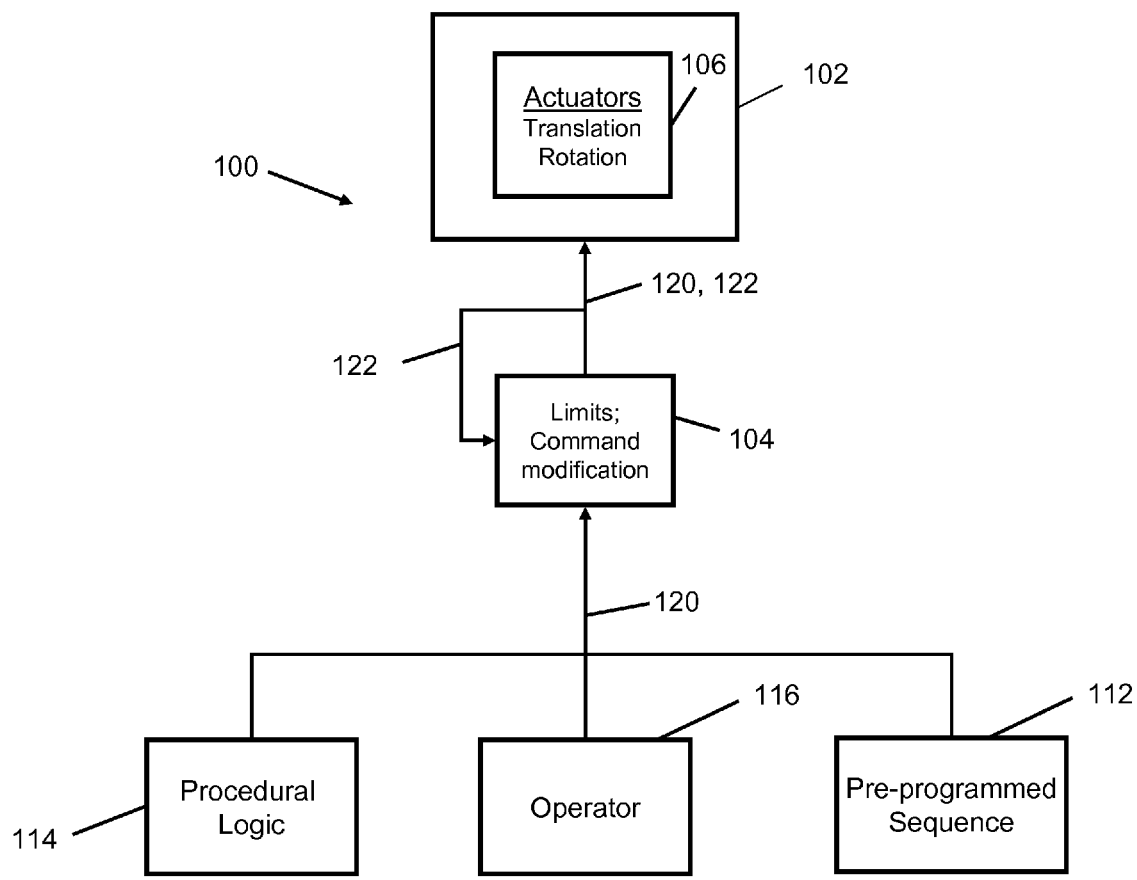
FIG. 1 is a block diagram illustrating an embodiment of an actuation system receiving data instructions.

FIG. 1 presents a block diagram schematically illustrating selected components of one example embodiment of an actuation system 100 for use in the animated figure. In an embodiment, the actuation system 100 comprises a motion system 102 and a motion control system 104. In general, the motion system 102 comprises combinations of hardware, software, firmware and communications links which are necessary for movement of the animated figure. For example, the motion system 102 may comprise a plurality of moveable subcomponents, such as actuators 106. The motion control system 104, also referred to as clipping system 104, comprises a plurality of processors which are configured to receive and analyze data instructions 120 from one or more of a variety of different control sources, and modify them, as necessary, to generate modified data instructions 122. In certain embodiments, the data instructions 120 and/or modified data instructions 122 are transmitted to the actuation system 100 in order to cause the motion system 102 to move between a first state of the system and a second state of the system. In alternative embodiments, the modified data instructions 122 generated by the motion control system 104 may be transmitted to other components of the actuated system 100 or outside the actuated system 100 for further processing or storage.

The motion control system 104 determines whether the original data instructions 120 will cause one or more of the moveable subcomponents of the motion system 102 to move outside a predefined motion space. In one embodiment, the predefined motion space is defined by physical constraints on the operation of the actuators 106, and includes position and/or movement constraints. Examples of position and movement parameters may comprise, but are not limited to, position (x, y, z), velocity ($v_x$, $v_y$, $v_z$), acceleration ($a_x$, $a_y$, $a_z$), jerk ($j_x$, $j_y$, $j_z$), and/or corresponding angles of rotation, angular velocities, etc. Data instructions 120 defining actuator 106 movements that remain within the predefined motion space are passed to the motion system 102 unmodified and are executed. Data instructions 120 defining actuator movements that would depart from the predefined motion space, however, are modified (also referred to as "clipped") in order to provide modified data instructions 122 to the motion system 102 which generate modified movements that will remain within the predefined motion space. In an example embodiment, the data instructions 120 are clipped smoothly, as referenced above and as described in greater detail below.

Beneficially, no human intervention is required in order to avoid the actuator limits and remain within the predefined motion space. The resulting operation of the system has several advantages. In one aspect, the clipping is performed such that viewers are substantially unaware that the clipping is taking place, enhancing their enjoyment of the spectacle provided by the mechanically actuated figure. In another aspect, this feature reduces the costs associated with maintaining the mechanically actuated figure, as by avoiding the limits, the likelihood of damaging the mechanical actuators or other components of the animated figure is substantially reduced.

In one embodiment, the actuators 106 of FIG. 1 comprise a plurality of motors configured to accept a plurality of instruction data, such as original data instructions 120 and/or modified data instructions 122, from the motion control system 104. In an example embodiment, the motors operate a series of link and joint elements which allow the actuators 106 to move a portion of the figure, such as a foot, at an arbitrary position with respect to the body of the figure, within a predefined motion space. For example, the motors may comprise a combination of electrically, pneumatically, and/or hydraulically powered motors.

In general, the processors of the motion control system 104 can include one or more of computers, program logic, instructions, controller circuitry, processor circuitry, general purpose single-chip and multi-chip microprocessors, digital signal processors, embedded microprocessors, dedicated single-chip and multi-chip processors, field programmable gate arrays (FPGA), application specific integrated circuit (ASIC), microcontrollers, and the like. The motion control system 104 is configured to communicate with the actuators 106, as well as receive instruction data 120 from one or more of a variety of different control sources. The processors provide data instructions 120 and modified data instructions 122 to the motion system 102 using generally understood electrical standards and software protocols in order to generate movements of the actuators between a first state and a second state.

The motion control system 104 is configured so as to modify, or clip, the instruction data 120 under certain circumstances. Instruction data 120 which generate movements lying within a predefined motion space are transmitted to the motion system 102 without modification. On the other hand, instruction data 120 which generate movements outside the predefined motion space are clipped before transmission to the actuators 106 and modified data instructions 122 are provided to the actuators 106. In cases where the instruction data is clipped, the motion control system 104 further considers the original instruction data 120 and the modified instruction data 122 in order to rejoin the original unclipped motion path generated by the original instruction data 120 and the clipped motion path generated by the modified instruction data 122.

In one embodiment, and as illustrated in FIG. 1, the instruction data 120 comprise a combination of pre-programmed sequences 112, procedural logic 114, and operator controlled instructions 116. Pre-programmed sequences 112 include, for example, defined sequences of actions intended for a particular effect, such as laughing or sneezing.

Procedural logic 114 enables certain portions of the figure to be moved using algorithms based on external inputs. For example, a tail portion of the figure may be configured such that the movement of the tail is controlled by an algorithm that causes the tail to wag based in part on how happy the figure is, without operator intervention, thus simulating the appearance of a real tail. Thus, while the algorithms are known, the exact movements at any given time are often complex and may not able to be predetermined. Procedural logic also optionally includes algorithms that generate movements based on sensed data from the environment surrounding the animated figure. For example, in one embodiment, the tail of an animated figure is programmed to wag based in part on what the robot sees.

Using operator controlled instructions 116, a human operator may override or augment one or more of the pre-programmed or procedural logic movements. In one example, the figure may be configured with a puppeting interface which allows the operator to move selected portions of the figure within a selected volume in response to the actions of viewers, thus enhancing the realistic appearance of the figure. An example of this approach is provided in U.S. Patent Application Number 2005/0153624, entitled "Computing Environment That Produces Realistic Motions For An Animatronic Figure".

In one embodiment, the data instructions 120 and modified data instructions may be communicated through one or more generally understood communication mechanisms. These communication mechanisms may comprise, but are not limited to, wire-based mechanisms, wireless mechanisms, and/or combinations thereof. For example, the wireless functionality may be facilitated by transmitters and receivers powered by a plurality of batteries or other power sources.

Figures 2A, 2B:
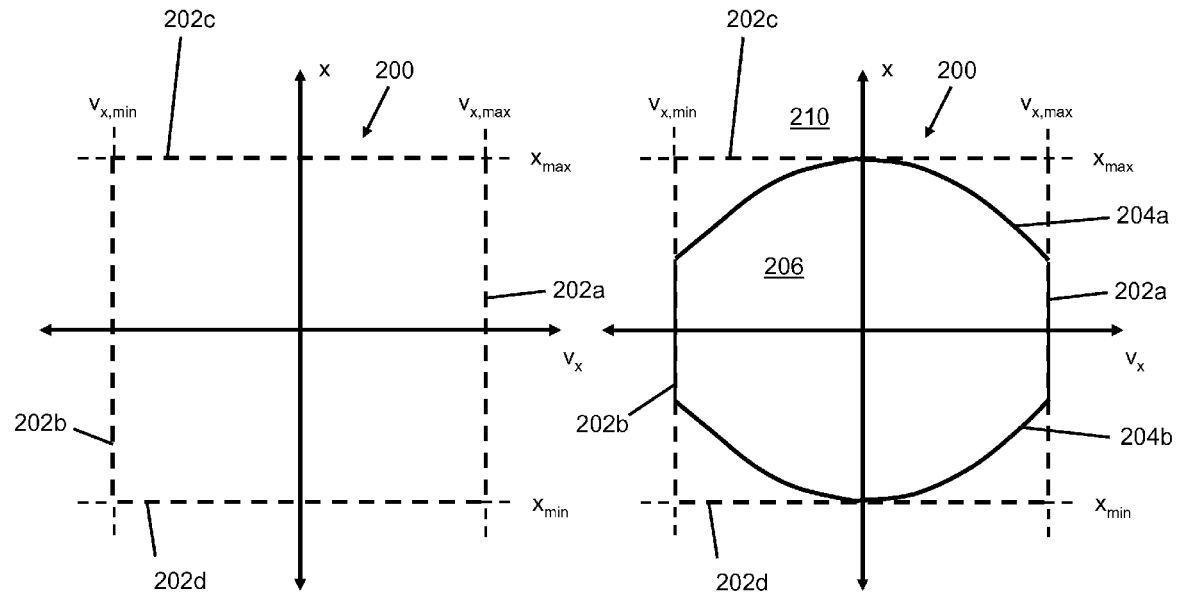
FIGS. 2A-2B are schematic illustrations of one embodiment of a state space illustrating the allowed and disallowed states of a hypothetical actuator within the actuation system.

The movements generated by the original instruction data 120, regardless of source, are subject to limits. These limits may be represented within a state space diagram 200, which illustrates a portion of all possible combinations of movements of an actuator. For example, FIGS. 2A-2B represent a state space for x-position (x) and x-velocity ($v_x$). Within the state space 200, the limits describe a boundary which contains a two-dimensional area of allowed movements 206 (also referred to interchangeably as an allowed space, a limit space, limit boundary, or a motion space), which represents the combination of movements which are allowable for a selected subcomponent of an animated figure.

In some cases, different actuators have different limit spaces, and furthermore, it is possible for the limit space for a selected actuator to change dynamically depending on the present state of the system. As discussed below, algorithms may be utilized to compute the limit space based upon the present state of the selected actuator, as well as the present state of other actuators within the figure.

Limit spaces may be represented for different combinations of states of the system, including, but not limited to, x, y, and z positions, as well as their associated derivatives, such as velocity ($v_x$, $v_y$, $v_z$) and acceleration ($a_x$, $a_y$, $a_z$). Similar limit spaces may also be represented in alternative coordinate systems. Additionally, it is also possible to define limit spaces having more than two dimensions.

In one embodiment, the limits are defined such that the position and velocity of the instruction data corresponding to allowable motions are bounded and continuous, while the acceleration is bounded but not necessarily continuous. These conditions are also referred to as $C^1$ clipping, in reference to the fact that the first derivatives of the actuator position are continuous. Thus, for example, $x \in [x_{min}, x_{max}]$
$v_x \in [v_{x,min}, v_{x,max}]$
$a_x \in [a_{x,min}, a_{x,max}]$ The position and velocity limits produce a rectangular region (dashed lines, FIGS. 2A, 2B) bounded on the left by minimum velocity $v_{x,min}$ (202b) and on the right by maximum velocity $v_{x,max}$ (202a), and bounded on the bottom by minimum position $x_{min}$ (202d), and on the top by maximum position $x_{max}$ (202c). In the following discussion, the instantaneous state of the system will be referred to as a point in state space identified by the position x and the velocity $v_x$.

The acceleration limits further define the allowable states, as illustrated in FIG. 2B. As a result of the acceleration limits, the actuator is capable of reaching the position maxima only at relatively low velocities; that is, the actuator should be able to "slow down" to come to rest at its position maxima. The maximum velocity ($v_{x,max}$) for each position (x) that still permits the motion to stop without exceeding the position limits, given the limited acceleration, is calculated by removing time (t) from the second order motion equations:

$$x = x_0 + v_{x,0} t + \frac{1}{2} a_x t^2 \quad \text{(Eqs. 1 and 2)}$$
$$v_x = v_{x,0} + a_x t$$

This leads to the bounds:

$$v_{x,min} \leq v_x \leq v_{x,max} \quad \text{(Eq. 3)}$$

$$x_{min} + \frac{v_x^2}{2 a_{x,max}} \leq x \leq x_{max} + \frac{v_x^2}{2 a_{x,min}} \quad \text{(Eq. 4)}$$

where $a_{x,max}$ and $a_{x,min}$ represent the maximum acceleration and minimum acceleration (i.e. maximum deceleration), respectively. The velocity boundary of Equation 3 is represented by lines 202a, 202b of FIG. 2B, while the position boundary of Equation 4 is represented by lines 204a, 204b of FIG. 2B. The position boundaries have a parabolic shape, and are defined by straightforward mathematical operations that do not require significant processor time to compute, thereby advantageously allowing them to be determined quickly. Thus, the region interior of the space defined by the lines 202a, 202b, 204a and 204b comprises the allowed states 206, while the region outside this space comprises the disallowed states 210 which are clipped. As discussed in greater detail below, "smooth clipping" is achieved by limiting the velocity as a function of the position and the acceleration limits associated with the physical system.

Figure 3A:
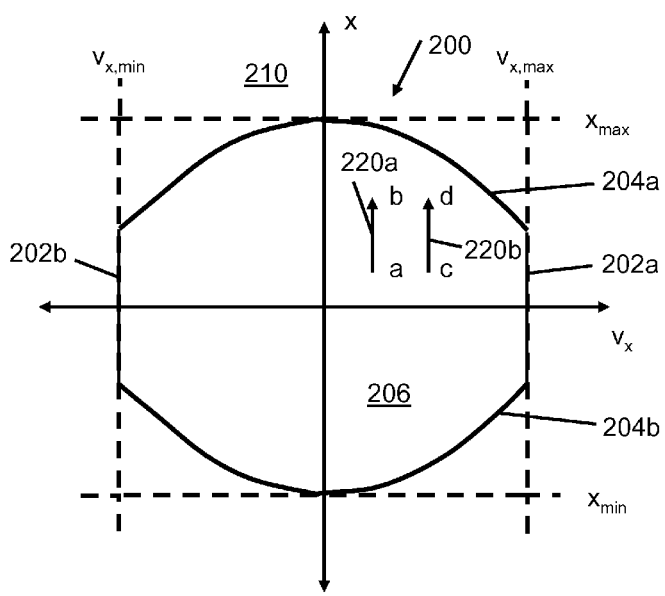
FIGS. 3A-3C schematically illustrate motion through the allowable region of the state space at constant velocity.

Motion of an actuator through a sequence of velocity and position states can be represented by a path in the state space 200. In general, equal distances in the state space 200 do not correspond to equal duration motions. This is because vertical motions near the $v_x$=0 axis take longer than vertical motions away from the $v_x$=0 axis. This principle is illustrated by the motions represented by the paths illustrated in FIGS. 3A-3C. FIG. 3A indicates two paths, from state a to state b (path ab, indicated by line 220a) and from state c to state d (path cd, indicated by line 220b). States a, b, c and d represent a state of an actuator, such as an actuator position and velocity, at a given time. Paths ab and cd both represent motion of the actuator for the same x distance at a fixed velocity, but path cd moves at a faster speed than path ab because it travels under a higher fixed velocity.

Figure 3B:
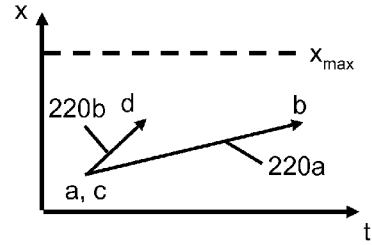
Figure 3C:
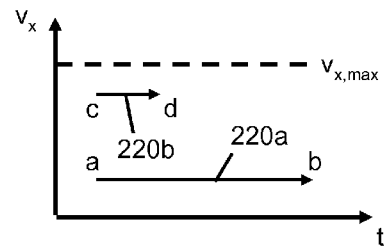

This motion is further illustrated in the more conventional plots of position and velocity as a function of time shown in FIGS. 3B and 3C. Here, ab and cd start at the same time and at the same position. Further, both paths follow straight lines, in keeping with the constant velocity (FIG. 3B). However, since cd has a greater velocity, it is traversed faster than ab (FIG. 3C).

While time is not directly shown on FIG. 3A, only certain paths through the allowed states 206 are possible for an actuator. In particular, since the right hand side of the state space 200 represents positive velocities, as time proceeds the value of x increases. This motion is represented in the state diagram 200 as upwards motion. Similarly, as the left hand side of the state space diagram 200 represents negative velocities, as time proceeds the value of x decreases. This motion is represented in the state diagram 200 as downwards motion (not shown). This "up on right, down on left" property is inherent in the nature of motion paths in the state diagram 200.

Figure 4:
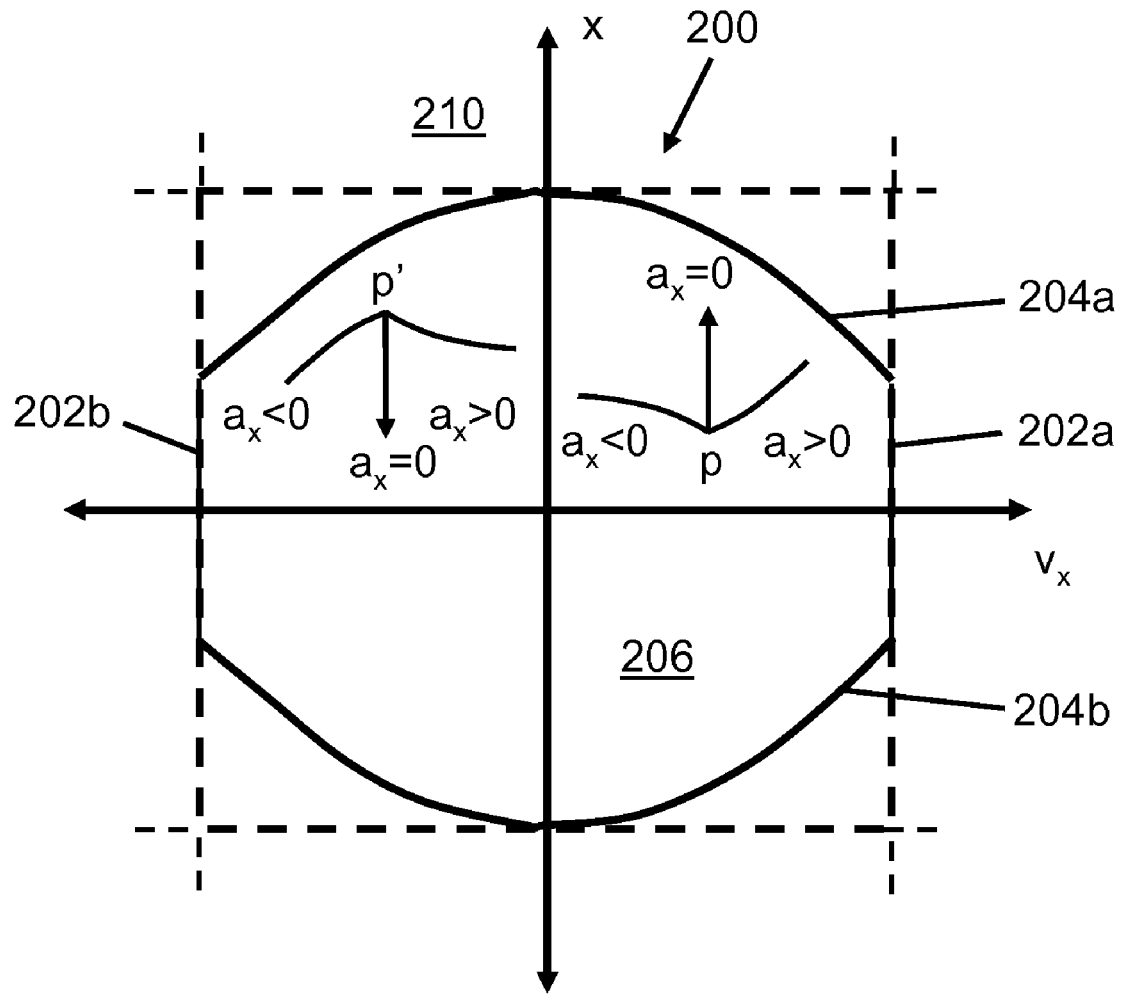
FIG. 4 schematically illustrates motion through the allowable region of the state space at non-constant velocity (non-zero acceleration)

While the paths in FIG. 3A demonstrate constant velocity, it is also possible for paths to have non-zero accelerations. In the state diagram 200, the higher the acceleration (or deceleration), the more horizontal the path becomes. Thus, from any state (for example, p or p') in the state diagram 200, there is roughly a "V" shaped region of possible modified states that the actuator can attain, as illustrated in FIG. 4. Stated alternatively, for an initial state of an actuator, the operation of the actuator can be modified to attain an infinite number of modified states, wherein the modified states are dependent upon the initial actuator state.

The "V" shaped region in the first quadrant of FIG. 4 can be better understood as follows. Consider motion originating in state p within the first quadrant, where velocity and position are positive. The left leg of the "V" represents the maximum possible decreasing velocity of the actuator, also referred to as negative acceleration or deceleration. The right leg of the "V" represents the maximum possible increasing velocity of the actuator, also referred to as positive acceleration. The center leg of the "V" represents zero acceleration, where the velocity remains constant. Since the velocity remains positive in each of these cases, the x-position increases. If the acceleration limits are constant throughout allowed space 206, then the path traveled under maximum acceleration will possess substantially the same shape as the parabolic clipping limit 204b directly beneath the point p and the maximum deceleration will possess substantially the same shape as the clipping limit 204a directly above the point p.

The converse is true in the second quadrant. Consider motion originating in state p' within the second quadrant, where position is positive and velocity is negative. The left leg of the "V" represents the maximum possible negative acceleration (increasing magnitude of negative velocity). The right leg of the "V" represents the maximum possible positive acceleration (decreasing magnitude of negative velocity). The center leg of the "V" represents zero acceleration, where the velocity remains constant. Since the velocity remains negative in each of these cases, the x-position decreases (that is, the "V" is inverted). As in the first quadrant, if the acceleration limits are constant throughout allowed space 206, then the path traveled under maximum acceleration will possess substantially the same shape as the parabolic clipping limit 204b directly beneath the point p' and the maximum deceleration will possess substantially the same shape as the clipping limit 204a directly above the point p'.

In a modified embodiment, the acceleration limits are variable in the allowed space, with a lower acceleration limits in regions near the position limits 204a, 204b. In this case, the path traveled under maximum acceleration will possess a shape that is dependent on the location of point p in the allowed space 206.

In general, clipping takes place for two reasons. In one case, the motion path leaves the static clipping region of the state diagram 200, such as by crossing one of the clipping limits 204a, 204b, 202a, or 202b. In the other case, the current acceleration/deceleration within the allowed states 206 exceeds the selected limits (that is, the motion path is outside the "V" of the current position, illustrated in FIG. 4).

Figure 5A:
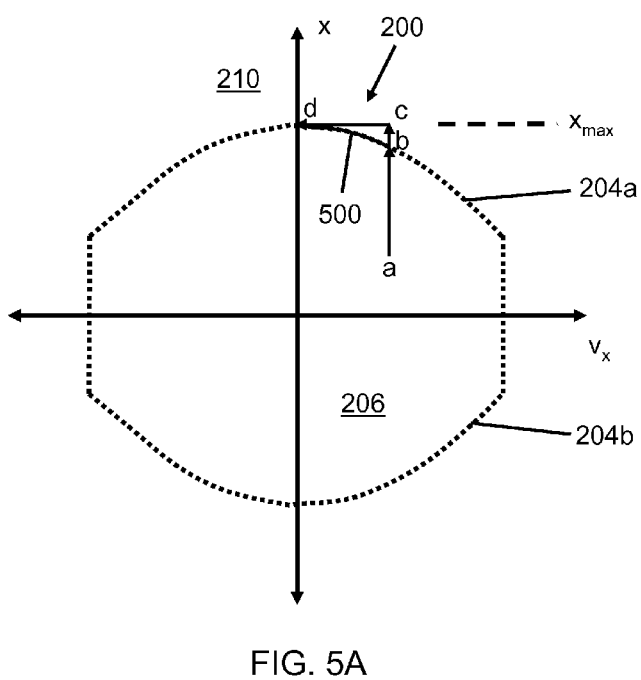
FIGS. 5A-5D schematically illustrate motion that is clipped to remain within the allowable region of the state space.
Figure 5B:
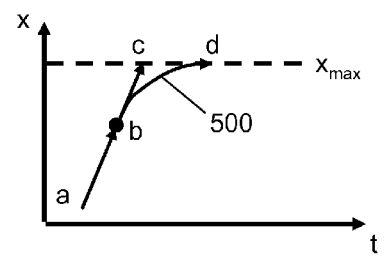
Figure 5C:
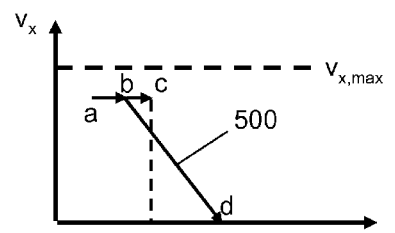

One example of a situation in which clipping is advantageous is illustrated in FIGS. 5A-5D. Consider an actuator having the state represented by point a and which receives instruction data to attain the state represented by point d, wherein $x=x_{max}$. As illustrated in FIGS. 5A and 5B, however, the path acd from state a to state d, which is typically referred to as the "unclipped motion path" moves from the allowed space 206 to $x_{max}$ without allowing time to smoothly stop. As a result, the actuated system reaches state c and immediately stops. The horizontal line from state c to state d in the state diagram 200 of FIG. 5A represents the impulse, a theoretically infinite deceleration. This is also shown by the dotted arrow in the velocity and acceleration versus time curves of FIGS. 5C and 5D. It is this sudden jarring that the "smooth clipping" algorithm of embodiments of the present disclosure seeks to reduce or substantially eliminate. In particular, by smoothly clipping the motion of the actuator to cause the actuator to slow before reaching the position limit $x_{max}$, such as illustrated in FIG. 5B, the disadvantages of conventional clipping described herein can be reduced or substantially eliminated.

Figure 5D:
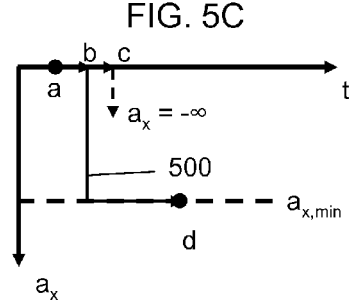

Conceptually, a "smooth clipping" algorithm recognizes that the path associated with motion generated by the instruction data will cross the clipping limit and, as a result, modifies the instruction data in order to generate a clipped motion that will remain within the allowed space 206. Until the actuator reaches state b, the motion path followed is according to the unmodified instruction data. However, once state b is attained, the instruction data is modified so as to cause the velocity of the actuator (FIG. 5C) to be linearly decreased at the maximum deceleration (FIG. 5D). The resultant motion path 500 follows the outer boundary of the allowed space 206, resulting in controlled deceleration from state b to state d along the clipping limit 204a, which corresponds to maximum deceleration of the actuator. Path abd is referred to as the "clipped motion path". Clipping eliminates or substantially inhibits the sudden stops which may otherwise occur, protecting the actuators of the system from damage and producing a motion that appears more graceful and realistic.

Once clipping has occurred, the objective of the motion control system is to "rejoin" the original unclipped motion path generated by the original instruction data and the clipped motion path generated by the instruction data as modified by the clipping algorithm. For example, referring again to FIG. 5A, the unclipped and clipped motion paths are rejoined at point d. Thus, two sets of instruction data are considered: the original instruction data input into the clipping algorithm and the modified instruction data output from the clipping algorithm. The goal is to bring these two motion paths together.

In one embodiment, the duration of the clipping is reduced by using the largest acceleration (or deceleration) that the actuator is capable of to rejoin the two motion paths. The resulting clipped motion path follows the outer boundary of the velocity envelope (the "V" shaped envelope discussed in respect to FIG. 4).

To understand this process, it is useful to note that there are an infinite number of allowable motion paths to any state in the state space. For example, five distinct motion paths that all end at state f are illustrated in FIGS. 6A-6C. While these five motion paths have widely varying lengths, they take the same amount of time to transition from their initial state (a, b, c, d or e) to state f. The motion path af has fixed velocity (zero acceleration), bf has the maximum positive acceleration (and has the shape of the corresponding clipping limit 204b), cf has half the maximum acceleration, df has half the maximum deceleration, and ef has the maximum deceleration (and has the shape of the corresponding clipping limit 204a).

Figure 6D:
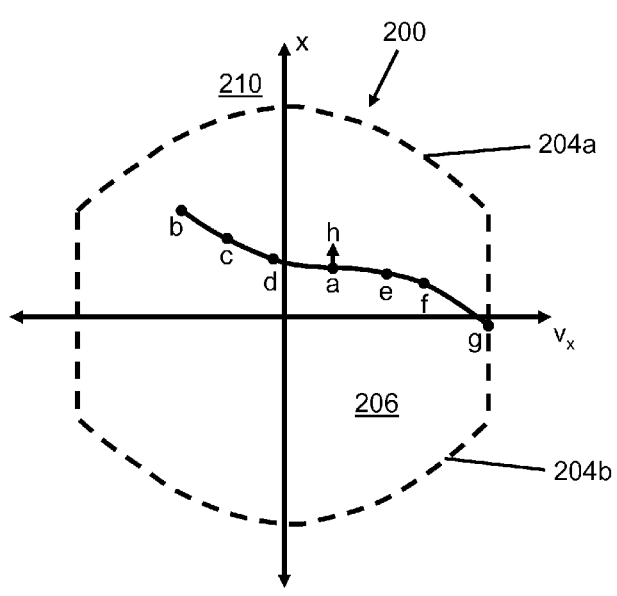
FIGS. 6D-6F schematically illustrate a locus of points that will eventually rejoin a fixed velocity motion path, given maximum acceleration (or deceleration).
Figure 6E:
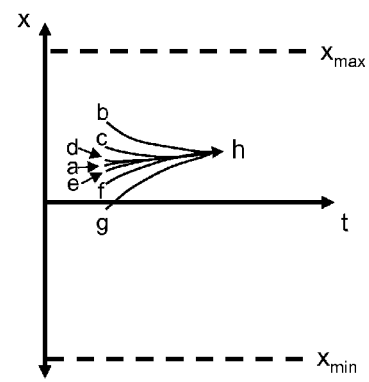
Figure 6F:
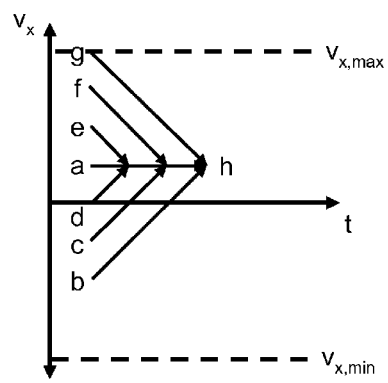

FIGS. 6A-6C illustrate motion paths used to rejoin the fixed velocity motion path af from a variety of states b, c, d and e; as described above, these motion paths represent varying accelerations. In contrast to this, FIGS. 6D-6F illustrate a locus of points that will eventually rejoin a fixed velocity motion path ah, given maximum acceleration (or deceleration). More specifically, if maximum acceleration is applied to an actuator in states b, c or d, the actuator will eventually rejoin fixed velocity motion path ah at or before state h. Likewise, if maximum deceleration is applied to an actuator in states e, f or g, the actuator will also eventually rejoin fixed velocity motion path ah at or before state h. FIG. 6E shows the path, illustrated in position-time space, that an actuator follows as it moves from one of the states a-g to rejoin at or before state h. Similarly, FIG. 6F shows the path, illustrated in velocity-time space, that an actuator follows as it moves from one of the states a-g to rejoin at or before state h.

As described above, the duration of the clipping is reduced by using the maximum acceleration (or deceleration) that the actuator is capable of to rejoin the two motion paths. In general, this is accomplished using two separate acceleration phases. The curve bcdaefg illustrated in FIG. 6D defines the separatrix that represents the transition between the first and second acceleration phases. This curve is defined by $$x = x_o + \frac{(v_{x,o} - v_x)^2}{2a_{x,min}}; \text{ if } v_x > v_{x,o}$$

$$x = x_o + \frac{(v_{x,o} - v_x)^2}{2a_{x,max}}; \text{ otherwise}$$

(Eq. 5)

This path has a parabolic shape, and is defined by straightforward mathematical operations that do not require significant processor time to compute, thereby advantageously allowing them to be determined quickly. In Equation 5, $a_x$ is given by $a_{x,max}$ for the left portion of the curve (bcda) in FIG. 6D and $a_{x,min}$ for the right portion of the curve (aefg). This further holds true for all of the "S" shaped curves (e.g., FIG. 6A).

Figure 6G:
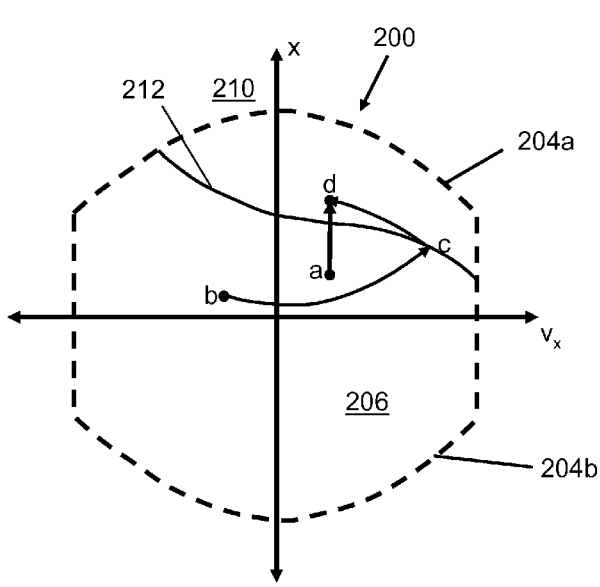
FIGS. 6G-6I schematically illustrate two separate acceleration phases which are used to rejoin an actuator in state b (representing a state of a clipped motion path) with a fixed velocity motion path starting in state a (representing a state of an unclipped motion path).
Figure 6H:
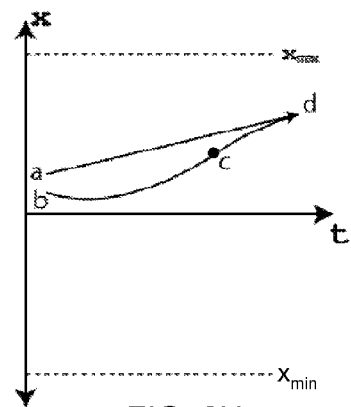
Figure 6I:
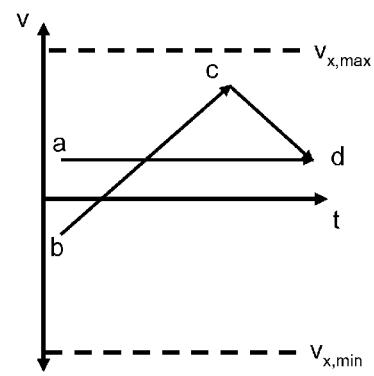

An example of rejoining a clipped motion path and an unclipped motion path is illustrated in FIGS. 6G-6I. Specifically, FIGS. 6G-6I illustrate two separate acceleration phases which are used to rejoin an actuator in state b (representing a state of a clipped motion path) with a fixed velocity motion path starting in state a (representing a state of an unclipped motion path). The actuator in state b has a smaller x value than the initial state a of the target motion path, and is moving in the opposite direction (negative velocity) from the velocity of the target motion path (which has positive velocity). Therefore, the first acceleration phase applied to the actuator in state b is a maximum acceleration phase. As described previously, applying maximum acceleration to the actuator in state b generates a motion path bc that has the same shape as the clipping limit 204b.

When the actuator reaches state c, transition to the second acceleration phase occurs. While the actuator in state c still has a smaller x value than the target motion path, the actuator in state c is now moving faster than the target motion path. Therefore, the second acceleration phase applied to the actuator in state c is a maximum deceleration phase. As described previously, applying maximum deceleration to the actuator in state c generates a motion path bd that has the same shape as the clipping limit 204a. Thus, the motion path bcd rejoins the constant velocity motion path ad at state d. FIG. 6H illustrates the motion paths ad and bcd in position-time space, while FIG. 6I illustrates the motion paths in velocity-time space.

Extending the example illustrated in FIGS. 6G-6I to the general case of an actuator having an initial state b anywhere in the range of allowed states 206, the point at which the transition between the first and second acceleration stage occurs, will define a separatrix line 212, as illustrated in FIG. 6G. As indicated above, this separatrix line 212 is defined by the locus of points illustrated in FIG. 6D. In states below the separatrix line 212, maximum acceleration is used to rejoin a constant velocity motion path; in states above the separatrix line 212, maximum deceleration is used to rejoin a constant velocity motion path.

A more general solution for rejoinder accounts for the fact that, during the period of data clipping, the unclipped motion path has variable acceleration. The fact that the unclipped motion path has variable acceleration can be addressed by generating a separatrix based on a range of accelerations instead of solely the maximum acceleration, as used in defining the separatrix illustrated in FIGS. 6D and 6G. For example, if the unclipped motion path accelerates toward the clipped motion path, and if the clipped motion path is using maximum acceleration to rejoin the unclipped motion path, the clipped motion path will not be able to accelerate fast enough (the acceleration is clipped) and will therefore overshoot the unclipped motion path. Thus, in one embodiment, the acceleration used by the clipped motion path is limited to between about the maximum acceleration and a lower bound, such as about half the maximum acceleration. It may be understood, however, that other larger or smaller fractions of the maximum acceleration may be employed as the lower bound in other embodiments. For example, in one embodiment, the acceleration used by the clipped motion path is limited to between about 75% and about 25% of the maximum acceleration. While this modification increases the time required to rejoin the unclipped motion path and the clipped motion path, it advantageously reduces the likelihood, and magnitude, of overshooting of an unclipped motion path by providing the additional acceleration headroom to rejoin a motion path that is accelerating toward the clipped motion path during the period of data clipping.

Figure 7:
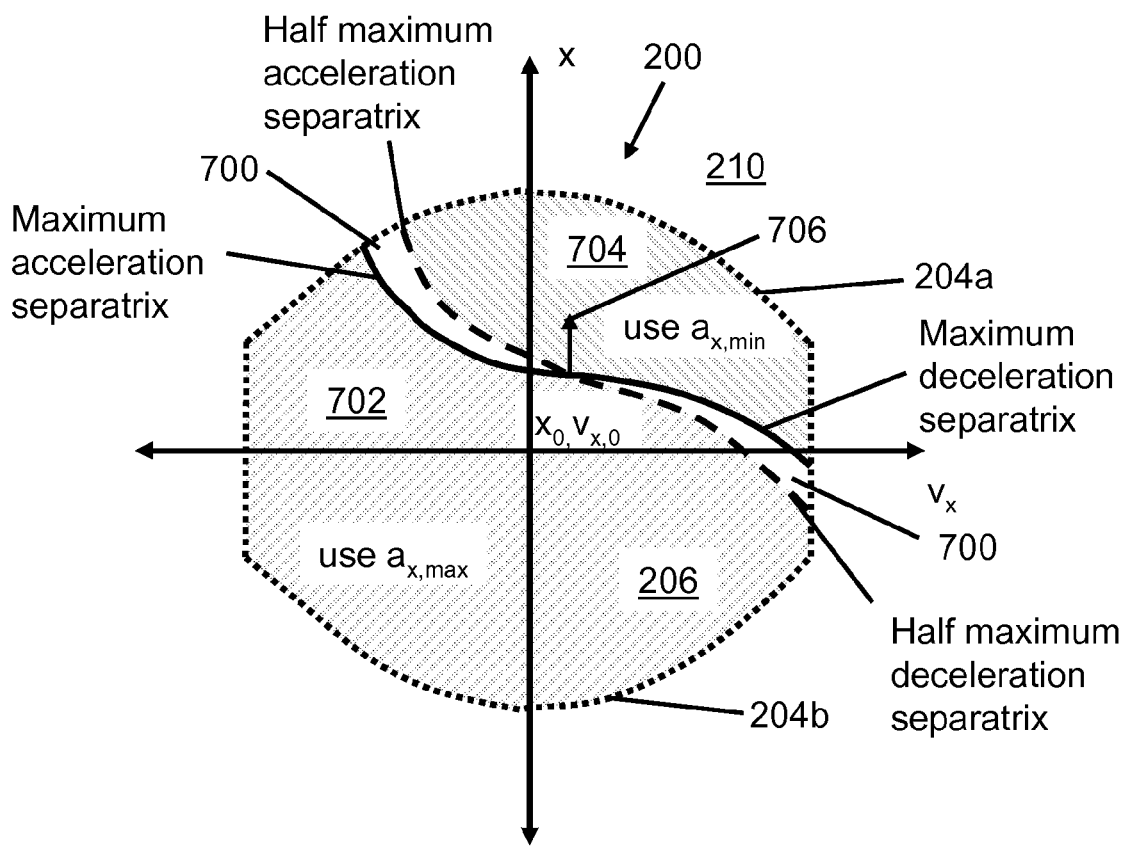
FIG. 7 schematically illustrates the process of rejoining clipped and unclipped motion paths under conditions of constant velocity in the original instruction data.

Although use of a clipped motion path having a range of accelerations is particularly advantageous in the context of a unclipped motion path with variable acceleration, this concept is more easily described if first illustrated in the context of an unclipped motion path with constant velocity. Thus, FIG. 7 illustrates the actions that the clipping system takes to rejoin a clipped motion path and an unclipped motion path 706 having constant velocity by generating a clipped motion path having a range of accelerations. In the region 700, the clipped motion path uses a limited constant acceleration or deceleration that allows the clipped motion path to rejoin the unclipped motion path 706 with a reduced likelihood and magnitude of overshooting. In one embodiment, the limited constant acceleration or deceleration has a value $a_x$ that is defined by $\frac{1}{2}a_{x,max} \leq a_x \leq a_{x,max}$ (for acceleration)

$a_{x,min} \leq a_x \leq \frac{1}{2}a_{x,min}$ (for deceleration)

In region 700, the acceleration or deceleration is preferably limited to between about 25% and about 75% of the maximum acceleration or deceleration (respectively), and is more preferably limited to about 50% of the maximum acceleration or deceleration (respectively). Outside region 700, two distinct acceleration phases are used to rejoin the motion paths, as described above with respect to FIGS. 6G-6I. Where the clipped motion path must be accelerated to rejoin the unclipped motion path 706, which is graphically represented by region 702 (below and to the left of region 700), first a maximum acceleration is used to catch up to the unclipped motion path 706. Eventually, the clipped motion path moves ahead of the unclipped motion path 706, so a second deceleration phase is used to rejoin the two motion paths. Likewise, where the clipped motion path must be decelerated to rejoin the unclipped motion path 706, which is graphically represented by region 704 (above and to the right of region 700), first a maximum deceleration is used to slow down to the unclipped motion path 706. Eventually, the clipped motion path falls behind the unclipped motion path 706, so a second acceleration phase is used to rejoin the two motion paths.

This approach has the advantage that the clipping system only decides what to do at the current instant, and does not need to plan the entire clipped motion path to rejoin the unclipped motion path. The clipping system determines whether a constant acceleration path can be used to rejoin the unclipped motion path (that is, whether the separatrix is within region 700). If such a path is available, the system will generate a clipped motion path having constant limited acceleration or deceleration as defined above. Otherwise, the system will generate a clipped motion path having maximum acceleration or deceleration, which causes the clipped motion path to eventually move into region 700.

Where the clipped motion path has only a slight deviation from the unclipped motion path, it is possible that applying a maximum acceleration or deceleration to the clipped motion path will cause the clipped motion path to overshoot the constant acceleration region 700. Thus, the clipping system optionally verifies that the state resulting from an applied acceleration is within region 700, and, if not, then applies a reduced acceleration or deceleration instead of the maximum.

As noted, the foregoing discussion with respect to FIG. 7 assumes that the unclipped motion path 706 has a constant velocity. In general, this may not be true, and a more accurate and robust solution for rejoining the clipped and unclipped motions paths considers the acceleration of the unclipped motion path. In embodiments wherein the actual acceleration of the unclipped motion path is unknown, it is optionally estimated through generally understood techniques, such as using a Kalman filter or another estimation technique.

Figure 8:
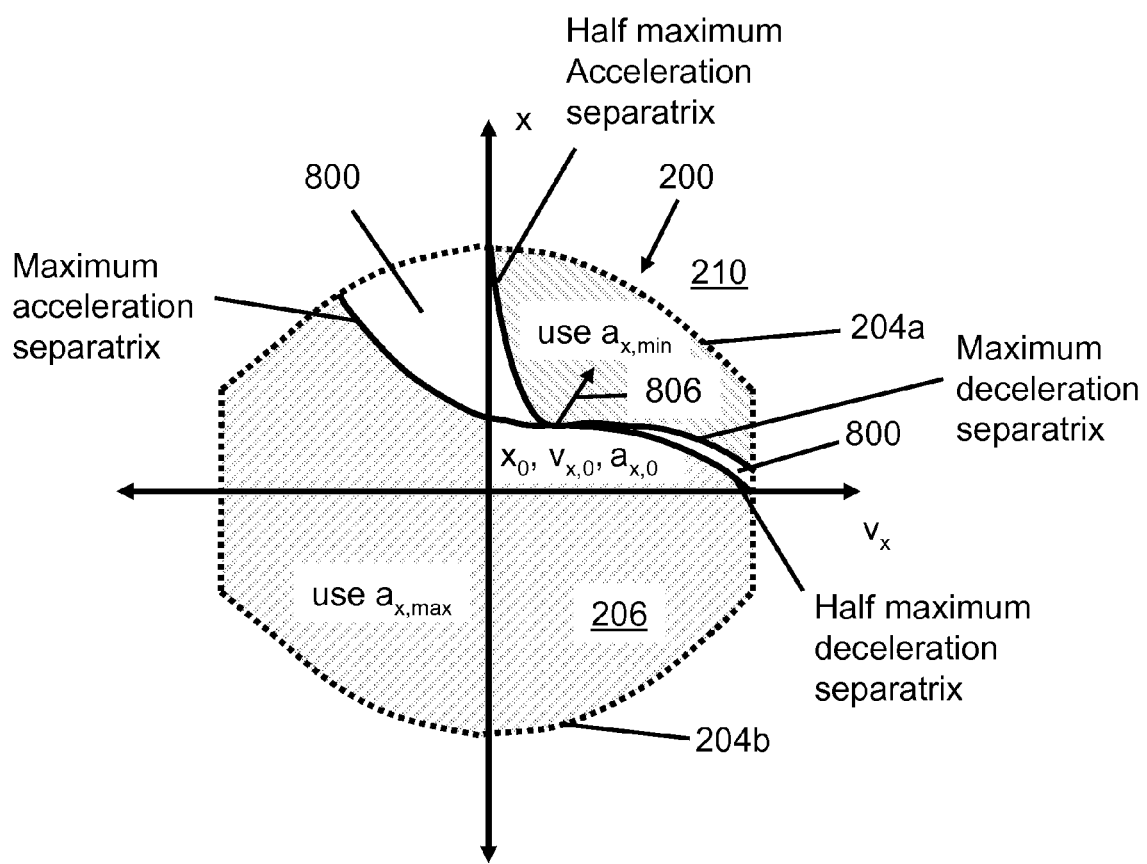
FIG. 8 schematically illustrates the process of rejoining clipped and unclipped motion paths under conditions of non-constant velocity in the original instruction data.

To account for situations where the unclipped motion path is accelerating toward or away from the clipped motion path, a modified region 800, illustrated in FIG. 8, defines states where the clipped motion path uses a limited constant acceleration or deceleration to rejoin an unclipped motion path 806 with variable velocity and/or acceleration. In this case, the equations for the motion paths having maximum acceleration and deceleration are given by:

$$x = x_0 + \frac{1}{2} \frac{(v_{x,0} - v_x)^2}{(a_{x,min} - a_{x,0})}; \text{if } v_x > v_{x,o} \quad \text{(Eq. 6)}$$

$$x = x_0 + \frac{1}{2} \frac{(v_{x,0} - v_x)^2}{(a_{x,max} - a_{x,0})}; \text{otherwise}$$

In FIG. 8, the unclipped motion path 806 has positive acceleration, resulting in region 800 having a wider lobe in regions where $v_x < v_{x,0}$, which corresponds to systems where the unclipped motion path 806 and the clipped motion path are accelerating toward each other. That is, there is an increased chance of the clipped motion path overshooting the unclipped motion path 806, so a reduced acceleration is implemented in a wider range of states. Region 800 has a narrower lobe in regions where $v_x > v_{x,0}$, which corresponds to systems where the unclipped motion path 806 and the clipped motion path are accelerating in the same direction. That is, there is a decreased chance of the clipped motion path overshooting the unclipped motion path 806, so a reduced acceleration is implemented in a narrower range of states.

It may be further noted that it is possible, in trying to rejoin the unclipped motion path, for the clipping algorithm to suggest a clipped motion path that extends outside the allowed region 206. For example, in FIG. 8, if the clipped instructions generate a state which is in the fourth quadrant of the state space 200 (positive velocity, negative position), it is possible that the clipping algorithm will accelerate the clipped motion path until its velocity is above $v_{x,max}$. Thus, the clipping system optionally further checks that the resulting velocity remains within the allowed region 206. If the clipped motion path has a velocity greater than $v_{x,max}$, then, in certain embodiments, the clipping system is configured to apply no further acceleration, thereby causing the clipped motion path to "slide up" the $v_{x,max}$ boundary of the allowed region 206.

Figure 9:
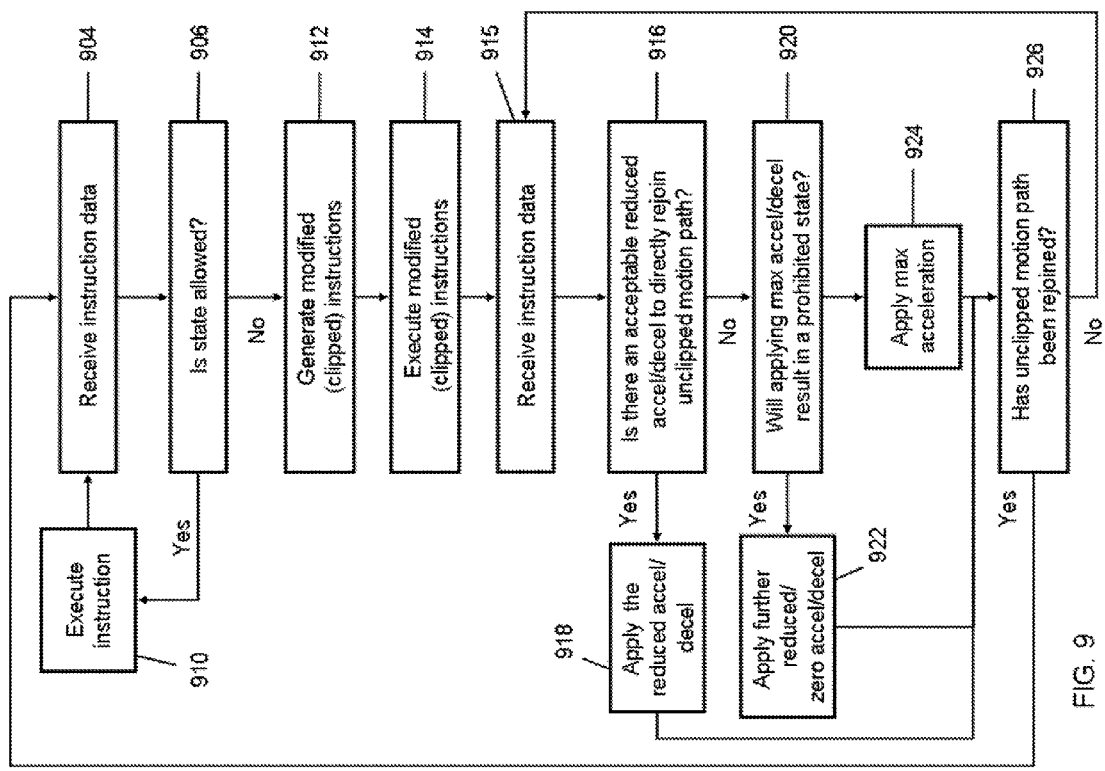
FIG. 9 is a flowchart illustrating one embodiment of a method of smooth clipping control.

FIG. 9 is a flowchart illustrating one example embodiment of a method of smooth clipping of data streams used to control an actuated object, such as an animated mechanical figure. In step 904, the motion control system receives instruction data 120 from one or more of a variety of different control sources, as described above. The instruction data 120 defines a target state that one or more selected actuators of the motion system is to reach, as well as an unclipped motion path between the initial state and the target state.

In step 906, the motion control system determines whether the unclipped motion path defined by the instruction data 120 will cause the selected actuator to attempt to reach a state outside the allowed region 206 of the state space 200. If the unclipped motion path defined by the instruction data 120 is within the boundaries that define the allowed region 206, the instruction data 120 are sent to the selected actuator to be executed in step 910.

If the unclipped motion path defined by the instruction data 120 will cause the selected actuator to attempt to reach a state outside the allowed region 206, the instruction data 120 is modified. The modified instruction data define a clipped motion path that remains within the allowed region 206. For example, in one embodiment the modified instruction data defines a clipped motion path that "slides along" one of the boundaries of the allowed region 206, such as the path abd illustrated in FIG. 5A. The modified instruction data are generated and executed by the selected actuator in steps 912 and 914.

Executing the modified instruction data causes the actuator to reach a new state along the clipped motion path. In step 915, the next increment of instruction data defining the unclipped motion path is received. In step 916, the motion control system determines whether there is an acceptable reduced acceleration that can be implemented to cause the clipped motion path to rejoin the unclipped motion path, received in 915. Use of reduced acceleration refers to the use of an acceleration less than the maximum attainable value, such as a value between the maximum and 50% of the maximum. If such an acceptable reduced acceleration exists, then this acceleration is applied to the clipped motion path in step 918.

If there is no acceptable reduced acceleration that can be implemented to cause the clipped motion path to rejoin the unclipped motion path, then the clipped motion path is analyzed in step 920 to determine whether applying the maximum acceleration would cause the actuator to attempt to reach a state outside the allowed region 206. If not, then the maximum acceleration is applied to the clipped motion path in step 924. Otherwise, a reduced acceleration is applied to the clipped motion path in step 922. In certain embodiments, such as when a velocity limit has been reached, no acceleration is applied to the clipped motion path.

After the maximum acceleration is applied to the clipped motion path (in step 924), or after a reduced acceleration is applied to the clipped motion path (in step 918 or step 922), the motion control system determines whether the unclipped and clipped motion paths have been rejoined in step 926. If so, then the process can repeat itself by receiving additional instruction data in step 904. Otherwise, the process returns to step 916, where the motion control system determines whether there is an acceptable reduced acceleration that can be implemented to cause the clipped motion path to rejoin the unclipped motion path.

Figure 10:
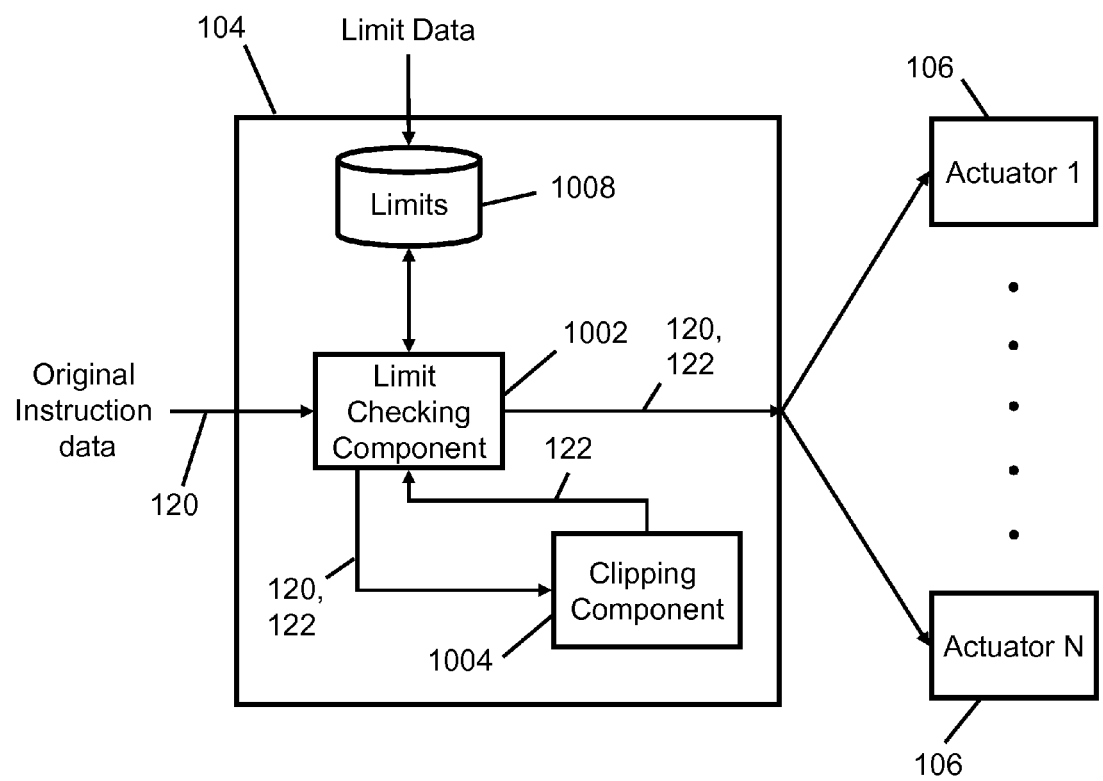
FIG. 10 is a block diagram of one embodiment of the motion control system of FIG. 1 which provides smooth clipping control.

FIG. 10 schematically illustrates an embodiment of the motion control system 104 of which may be used to carry out the method illustrated in FIG. 9. The instruction data 120 are received by a limit checking component 1002 which determines whether the unclipped motion path defined by the instruction data 120 will cause the selected actuator to attempt to reach a state outside the allowed region 206 of the state space 200. In one embodiment, limit data is optionally provided to the motion control system 104 by an operator of the actuated system and stored in a limit data storage component 1008. Alternatively, or additionally, the limit data is generated by the motion control system 104 from algorithms provided by the operator of the actuated system. Regardless of how the limit data is generated, the limit checking component 1002 may access the limit data from a limit data storage component 1008 to make the comparison.

If the limit checking component 1002 determines that the unclipped motion path defined by the instruction data 120 is within the boundaries that define the allowed region 206, the instruction data 120 are sent to one or more selected actuators. The selected actuators then carry out the defined movements.

On the other hand, if the limit checking component 1002 determines that the unclipped motion path defined by the instruction data 120 will cause the selected actuator to attempt to reach a state outside the allowed region 206, the instruction data 120 is modified in order to generate the modified instruction data 122. As illustrated in FIG. 10, the limit checking component 1002 outputs the instruction data 120 to a clipping component 1004. Based upon the desired movements, as represented by the instruction data 120, the clipping component 1004 calculates modified instruction data 122. As discussed above, the modified instruction data define a clipped motion path that remains within the allowed region 206. In an example embodiment, the clipping component 1004 generates modified instruction data 122 that causes the clipped motion path to rejoin the unclipped motion path as quickly as possible without passing the limit surface, as discussed above. For example, the clipping component 1004 determines a rejoinder acceleration which is approximately equal to the maximum acceleration. In other embodiments, the rejoinder acceleration may lie between the maximum acceleration and a fraction of the maximum acceleration, for example, between about 75% to 25%. In another example embodiment, the clipping component 1004 generates modified instruction data 122 that causes the clipped motion path to rejoin the unclipped motion path in a way that expends a minimum amount of energy. In further embodiments, the motion control system may utilize the original instruction data 122 input into the motion control system 104 and the modified instruction data 122 output from the motion control system 104 in order to rejoin the unclipped and clipped motion paths. In still other embodiments, the modified instruction data 122 is configured to reduce, increase, or otherwise optimize other characteristics of the system.

The limit checking component 1002 is also used to determine whether applying a selected acceleration to the clipped motion path will cause the actuator to attempt to reach a state outside the allowed region 206. This addresses situations where, for example, the modified instruction data 122 generates movements which are outside other limits of the actuator (for example, the "V" shaped regions of FIG. 4), or which may cause a second actuator to exceed its limit space in compensating for the action of a first actuator. As another example, this also addresses situations where the modified instruction data 122 calls for an acceleration which is within the boundary limits of an actuator but a resultant velocity which falls outside the boundary limits of the actuator. In this case, the limit checking component 1002 returns the modified instruction data 122 to the clipping component 1004 for further modification in order to limit the out of range movements. In one example embodiment, the clipping component 1004 further modifies the modified instruction data 122 such that the clipped motion path "slides along", but does not exceed, the boundary of the allowed region 206. Optionally, this process is repeated until the modified instruction data 122 satisfies the limits, as determined by the limit checking component 1002. Subsequently, the modified instruction data 122, limited as applicable to remain within the allowed region 206, are then transmitted to the actuators for execution.

In general, data clipping in this manner can preserve the appearance of fluid movements to the benefit of viewers of an animated figure while also reducing the likelihood of damaging the actuated system. For example, clipping may be used in the execution of composite sequences. As discussed above, there are certain actions which may be implemented in a figure that are a combination of a plurality of component sequences. Examples may include a figure that receives commands from a puppet controller, such as a command to turn and look at the audience, while also receiving preprogrammed commands from a controller, such as preprogrammed hiccupping or laughing routines. Composite movements such as these may be implemented by coordinated motion of portions of the figure such as the face, neck, shoulders, and torso, and other portions. A situation may arise, however, where the composite motion produces target states that are beyond the abilities of the actuators. For example, a laugh sequence may require the figure to lift its head, which may not be possible if the head has already been puppet-controlled into a position that is not compatible with further lifting. If one or more of the actuators necessary to perform this motion are in a state where no further vertical extension of the neck can be provided, such movements will encounter the limits of one or more actuators.

The smooth clipping methods may address this problem in the following manner. Upon determining that the instruction data will result in movement of one or more actuators outside their selected limits, the motion control system generates clipped instruction data. In one example, the clipped instructions cause the actuated figure to perform the components of the laugh that are within the limits while removing the components of the laugh that are outside the limits. In this example, if the neck was already bent back no additional backwards motion would be possible, but any side-to-side or subsequent forward motion would be allowed.

Although the foregoing description has shown, described, and pointed out certain features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion.

What is claimed is:

1. A method for controlling movement of a movable object having a plurality of movable subcomponents, the method comprising:

receiving at a system including at least one processor an instruction configured to generate a defined movement of a selected subcomponent of the movable object from an initial state, through a first set of intermediary states, to a target state;

determining whether one or more states comprising the first set of intermediary states are outside a motion space associated with the selected subcomponent;

determining a rejoinder acceleration that, when applied to a selected state in the first set of intermediary states, causes states subsequent to the selected state to remain within the motion space;

producing a modified instruction configured to generate a modified movement of the selected subcomponent from the initial state, through a second group of intermediary states, to the target state, when at least a portion the first set of intermediate states is projected to lie outside the motion space, wherein the modified instruction is produced by applying the rejoinder acceleration to at least one of the states comprising the first set of intermediary states, and wherein the second group of intermediate states are within the motion space providing the modified instruction to the selected subcomponent of the movable object.

2. The method of claim 1, wherein the rejoinder acceleration comprises a first acceleration value applied during a first time period, and a second acceleration value applied during a second time period.

3. The method of claim 2, wherein:
the first acceleration value is approximately equal to a maximum acceleration associated with the selected subcomponent; and
the second acceleration value is less than the maximum acceleration associated with the selected subcomponent.

4. The method of claim 3, wherein the second acceleration value is between the maximum acceleration associated with the selected subcomponent, and half of the maximum acceleration associated with the selected subcomponent.

5. The method of claim 1, wherein the motion space represents limits on a position and a velocity of the selected subcomponent.

6. The method of claim 1, wherein the motion space represents limits on a position, a velocity, and an acceleration of the selected subcomponent.

7. The method of claim 1, wherein at least a portion of the second group of intermediary states lies along at least a portion of a boundary of the motion space.

8. The method of claim 1, further comprising determining whether execution of the modified instruction results in a second subcomponent of the movable object leaving a second motion space associated with the second subcomponent.

9. The method of claim 1, wherein the movable object comprises an animated humanoid figure.

10. A system for controlling the movement of an actuator, the system comprising:
a first processing module that (a) receives motion instructions that define a movement of the actuator from an initial state, through a first set of intermediary states, to a target state and (b) determines whether one or more states comprising the first set of intermediary states are outside a motion space associated with the actuator; and
a second processing module that (a) determines a rejoinder acceleration that, when applied to a selected state in the first set of intermediary states, causes states subsequent to the selected state to remain within the motion space and (b) generates modified motion instructions that define a modified movement of the actuator from the initial state, through a second group of intermediary states, to the target state;
wherein at least a portion the first set of intermediate states is projected to lie outside the motion space, wherein the modified instruction is produced by applying the rejoinder acceleration to at least one of the states comprising the first set of intermediate states, and wherein the second group of intermediate states are within the motion space.

11. The system of claim 10, wherein the rejoinder acceleration comprises a first acceleration value applied during a first time period, and a second acceleration value applied during a second time period.

12. The system of claim 11, wherein:
the first acceleration value is approximately equal to a maximum acceleration associated with the actuator; and
the second acceleration value is less than the maximum acceleration associated with the actuator.

13. The system of claim 10, wherein the motion space represents limits on a position and a velocity of the actuator.

14. The system of claim 10, wherein the motion space represents limits on an acceleration of the actuator.

15. An animated object having a moveable subcomponent, the animated object comprising:
an actuator capable of moving the subcomponent from an initial state to a target state; and
a motion control system that is configured to:
receive instruction data that generates a defined movement of the subcomponent from the initial state, through a first set of intermediate states, to the target state,
determine whether one or more states comprising the first set of intermediate states are outside a motion space associated with the subcomponent,
determine a rejoinder acceleration that, when applied to a selected state in the first set of intermediate states, causes states subsequent to the selected state to remain within the motion space, and
produce modified instruction data that generates a modified movement of the selected subcomponent from the initial state, through a second group of intermediary states, to the target state, wherein (a) at least a portion the first set of intermediate states is projected to lie outside the motion space, (b) the modified instruction is produced by applying the rejoinder acceleration to at least one of the states comprising the first set of intermediary states, and (c) the second group of intermediate states are within the motion space.

16. The animated object of claim 15, wherein the motion space is defined, at least in part, by a velocity limit associated with the subcomponent and a position limit associated with the subcomponent.

17. The animated object of claim 15, further comprising a second moveable subcomponent, wherein the motion control system is further configured to generate instruction data associated with the second moveable subcomponent based at least in part on the modified instruction data.

18. The animated object of claim 15, wherein the motion space is bounded by an allowed motion space boundary, and wherein the second group of intermediary states lies along at least a portion of the allowed motion space boundary.

19. The animated object of claim 18, wherein the motion space boundary is defined, at least in part, by an acceleration limit associated with the subcomponent.

20. The animated object of claim 18, wherein the motion space boundary is defined, at least in part, by a position limit and a velocity limit associated with the subcomponent.

21. The animated object of claim 15, wherein the initial and target states are defined by a Cartesian coordinate and a first-order derivative of the Cartesian coordinate.

22. The animated object of claim 15, wherein the moveable subcomponent comprises an electrically-powered actuator.

* * * * *

UNITED STATES PATENT AND TRADEMARK OFFICE
CERTIFICATE OF CORRECTION

PATENT NO. : 7,706,920 B2  Page 1 of 1
APPLICATION NO. : 11/858026
DATED : April 27, 2010
INVENTOR(S) : Alexis Paul Weiland It is certified that error appears in the above-identified patent and that said Letters Patent is hereby corrected as shown below:

At column 16, line 65-67, please delete, "space providing the modified instruction to the selected subcomponent of the movable object." and insert therefore, --space and, providing the modified instruction to the selected subcomponent of the movable object.--.

At column 18, line 1, please delete, before "the second" delete "and".

Signed and Sealed this

Twenty-eighth Day of September, 2010

David J. Kappos
*Director of the United States Patent and Trademark Office*